(12) United States Patent
Paterson et al.

(10) Patent No.: US 12,450,634 B2
(45) Date of Patent: Oct. 21, 2025

(54) MEDIA GENERATION SYSTEM AND METHODS OF PERFORMING THE SAME RELATED APPLICATIONS

(71) Applicant: MATTHEWS INTERNATIONAL CORPORATION, Pittsburgh, PA (US)

(72) Inventors: Daniel Stewart Paterson, Penang (SG); Jaisankar Meenakshi Sundaram, Penang (SG)

(73) Assignee: Schawk USA LLC, Pittsburgh, PA (US)

( * ) Notice: Subject to any disclaimer, the term of this patent is extended or adjusted under 35 U.S.C. 154(b) by 710 days.

(21) Appl. No.: 14/837,632

(22) Filed: Aug. 27, 2015

(65) Prior Publication Data

US 2016/0063576 A1  Mar. 3, 2016

Related U.S. Application Data

(60) Provisional application No. 62/042,471, filed on Aug. 27, 2014.

(51) Int. Cl.
*G06Q 30/02* (2023.01)
*G06Q 30/0241* (2023.01)

(52) U.S. Cl.
CPC ................................ *G06Q 30/0276* (2013.01)

(58) Field of Classification Search
CPC .................................................. G06Q 30/0276
See application file for complete search history.

(56) References Cited

U.S. PATENT DOCUMENTS 6,044,376 A  3/2000  Kurtzmann, II
7,849,049 B2 *  12/2010  Langseth ............... G06F 16/254
                                                       707/602

(Continued)

FOREIGN PATENT DOCUMENTS

CN  101427243 A  5/2009
CN  101615268 A  12/2009

(Continued)

OTHER PUBLICATIONS

Author(s):Dejean, Herve . Title: Extracting structured data from unstructured document . Journal:ICDAR [online]. Publication date:Aug. 15, 2015 .[retrieved on: _ Dec. 15, 2021 ]. Retrieved from the Internet: < URL: https://ieeexplore.ieee.org/stamp/stamp.jsp?tp=&arnumber=7333766> (Year: 2015).*

(Continued)

*Primary Examiner* — David J Stoltenberg
(74) *Attorney, Agent, or Firm* — Merchant & Gould P.C.

(57) ABSTRACT

A media management system including a content analysis unit that analyzes the information on the media output to identify the data structure of the information and compares the information structure to known information structures, a template analysis unit that reformats the information to a similar file structure if the structure of the information is substantially similar to a known information structure, creates a new information structure based on the structure of the file information if the structure of the information is not substantially similar to a known information structure, and a media production unit that generates a media product based on the structured information.

18 Claims, 5 Drawing Sheets

(56) References Cited

U.S. PATENT DOCUMENTS

| | | | |
|---|---|---|---|
| 7,962,933 B2 | 6/2011 | Huang et al. | |
| 8,224,090 B2* | 7/2012 | Takebe | G06K 9/00463 |
| | | | 382/173 |
| 8,230,332 B2 | 7/2012 | Summers et al. | |
| 2002/0099735 A1 | 7/2002 | Schroeder et al. | |
| 2006/0007466 A1* | 1/2006 | Ben-Yehuda | G06F 40/154 |
| | | | 358/1.13 |
| 2006/0101332 A1* | 5/2006 | Imielinski | G06F 40/16 |
| | | | 715/255 |
| 2006/0161635 A1* | 7/2006 | Lamkin | G06F 16/4387 |
| | | | 709/217 |
| 2007/0027901 A1* | 2/2007 | Chan | G06Q 30/0277 |
| 2007/0168382 A1* | 7/2007 | Tillberg | G06F 16/5846 |
| | | | 707/E17.084 |
| 2007/0214695 A1 | 9/2007 | Frank et al. | |
| 2009/0157450 A1 | 6/2009 | Athsani et al. | |
| 2009/0173792 A1* | 7/2009 | Montague | G06Q 30/0641 |
| | | | 235/487 |
| 2009/0300054 A1 | 12/2009 | Fisher et al. | |
| 2010/0004944 A1* | 1/2010 | Palaniappan | G06Q 10/10 |
| | | | 707/E17.108 |
| 2012/0278705 A1 | 11/2012 | Yang et al. | |
| 2012/0303645 A1 | 11/2012 | Kulkarni-Puranik | |
| 2013/0104251 A1* | 4/2013 | Moore | G06F 21/602 |
| | | | 726/30 |
| 2013/0339843 A1 | 12/2013 | Guzman | |
| 2014/0157296 A1* | 6/2014 | Amidei | H04L 67/10 |
| | | | 725/13 |
| 2014/0257935 A1* | 9/2014 | Killoh | G06Q 30/0276 |
| | | | 705/7.35 |
| 2015/0154660 A1* | 6/2015 | Weald | H04L 67/42 |
| | | | 705/14.73 |
| 2015/0254711 A1* | 9/2015 | Chand | G06Q 30/0269 |
| | | | 705/14.53 |
| 2015/0350016 A1* | 12/2015 | Gundugola | H04L 41/145 |
| | | | 709/223 |

FOREIGN PATENT DOCUMENTS

| | | |
|---|---|---|
| CN | 101661512 A | 3/2010 |
| CN | 101236609 B | 9/2012 |
| CN | 103150584 A | 6/2013 |
| JP | 2002537602 A | 11/2002 |
| JP | 2003140960 A | 5/2003 |
| JP | 2003271582 A | 9/2003 |
| JP | 2003288332 A | 10/2003 |
| JP | 2006318086 A | 11/2006 |
| JP | 2007012059 A | 1/2007 |
| JP | 2012266740 A | 11/2012 |

OTHER PUBLICATIONS

Author(s):Dejean, Herve . Title: The claremont report on database research . Journal:SIGMOD[online]. Publication date:Sep. 2008. [retrieved on: Oct. 31, 2022 ]. Retrieved from the Internet: < URL:https://dl.acm.org/doi/pdf/10.1145/1462571.1462573> (Year: 2008).*
Author(s):Rusu Title: converting unstructured and semi structured data Journal:IEEE[online]. Publication date:2013 .[retrieved on: Sep. 1, 2023 ]. Retrieved from the Internet: < URL:https://ieeexplore.ieee.org/abstract/document/6511736> (Year: 2013).*
Author(s):Schafer Title: Combining OCR output for logical document structure markup Journal:IEEE[online]. Publication date: 2012 .[retrieved on: Jan. 25, 2024 ]. Retrieved from the Internet: < URL:https://aclanthology.org/W12-3212.pdf> (Year: 2012).*
Author(s):Abdullah Title: mapping process of unstructured data to structure data Journal: IEEE[online]. Publication date:2013 .[retrieved on: Aug. 10, 2024 ]. Retrieved from the Internet: <URL:https://ieeexplore.ieee.org/abstract/document/6716700?casa_token=McnmECBqx70AAAAA:lokVkYrSace0O8CBClmSQE8iL17> (Year: 2013).*
Author(s):Bey, S Title: Alignment of structured and unstructured data for decision support Journal: University of Studente [online]. Publication date:2014 .[retrieved on: Jan. 9, 2025 ]. Retrieved from the Internet: <URL:https://essay.utwente.nl/65294/1/Bey_BA_MB.pdf> (Year: 2014).*
Abidin et al., Extraction and Classification of Unstructured Data in WebPages for Structured Multimedia Database via XML, 978-1-4244-5651-2/10/$26.00 © 2010 IEEE.*
International Search Report and Written Opinion issued on Nov. 30, 2015 in connection with PCT/US2015/047205. 10 pages.
Supplementary European Search Report for EP 15837051 dated Jan. 22, 2018.
E Wing: Data Conversion: Difference Between Revisions, Wikipedia, May 28, 2014 (downloaded by EPO on Oct. 28, 2019, retrieved by applicant on Dec. 4, 2019), 5 pages.

* cited by examiner

MEDIA GENERATION SYSTEM AND METHODS OF PERFORMING THE SAME RELATED APPLICATIONS

RELATED APPLICATIONS

This application claims the benefit of and the priority from U.S. provisional Application No. 62/042,471 filed Aug. 27, 2014 entitled MEDIA GENERATION SYSTEM AND METHODS OF PERFORMING THE SAME, which is incorporated in its entirety herein by reference.

BACKGROUND OF THE INVENTION

In modern media campaigns, large amounts of information concerning the look and feel of specific media elements are used to generate custom marketing and mailing materials. The information may or may not be delivered in a structured format. Further, when in a structured format, no uniform rules exist to standardize the structure of information that is used in media development.

A need exists for a system that will allow for the standardization of information used to generate custom media products.

SUMMARY OF THE INVENTION

One embodiment of the present disclosure includes a media management system including a content analysis unit that analyzes the information on the media output to identify the data structure of the information and compares the information structure to known information structures, a template analysis unit that reformats the information to a similar file structure if the structure of the information is substantially similar to a known information structure and creates a new information structure based on the structure of the file information if the structure of the information is not substantially similar to a known information structure, and a media production unit that generates a media product based on the structured information.

In another embodiment, the content analysis unit may analyze header information in a file.

In another embodiment, the content analysis unit may identify at least one data element in the media output.

In another embodiment, the content analysis unit compares the at least one identified data element to at least one known data element.

In another embodiment, a template analysis unit may identify an information template base don't he comparison of the identified data elements with the known data elements.

In another embodiment, the template analysis unit may identify at least one rule associated with the template.

In another embodiment, the template analysis unit may apply the at least rule to the media output.

In another embodiment, the data structure of the media outlet may be an extensible markup language structure.

In another embodiment, the data structure of the media outlet may be a comma separated variable structure.

In another embodiment, the media outlet is unstructured.

Another embodiment of the present disclosure includes a method of structuring media including the steps of gathering information on a media output, analyzing the information on the media output to identify the data structure of the information, comparing the information structure to known information structures, reformatting the information to a similar file structure if the structure of the information is substantially similar to a known information structure, creating a new information structure based on the structure of the file information if the structure of the information is not substantially similar to a known information structure, and generating a media product based on the structured information.

In another embodiment, the method includes the step of analyzing the information on the media output may include analyzing header information in a file.

In another embodiment, the method includes the step of analyzing the information on the media output may include the step of identifying at least one data element in the media output.

In another embodiment, the method includes the step of comparing the at least one identified data element to at least one known data element.

In another embodiment, the method includes the step of identifying an information template based on the comparison of the identified data elements with the known data elements.

In another embodiment, the method includes the step of identifying at least one rule associated with the template.

In another embodiment, the method includes the step of applying the at least rule to the media output.

In another embodiment, the data structure of the media outlet may be an extensible markup language structure.

In another embodiment, the data structure of the media outlet may be a comma separated variable structure.

In another embodiment, the media outlet may be unstructured.

BRIEF DESCRIPTION OF THE DRAWINGS

Details of the present invention, including non-limiting benefits and advantages, will become more readily apparent to those of ordinary skill in the relevant art after reviewing the following detailed description and accompanying drawings, wherein.

DETAILED DESCRIPTION OF THE INVENTION

While various embodiments of the present invention are described herein, it will be apparent to those of skill in the art that many more embodiments and implementations are possible that are within the scope of this invention. Accordingly, the present invention is not to be restricted except in light of the attached claims and their equivalents.

Described herein is a system for reading media information from a media file, identifying the media information and generating media output based on the media information. The system also standardizes media information by reformatting media information into predetermined templates or generating new templates based on the new media information.

Figure 1:
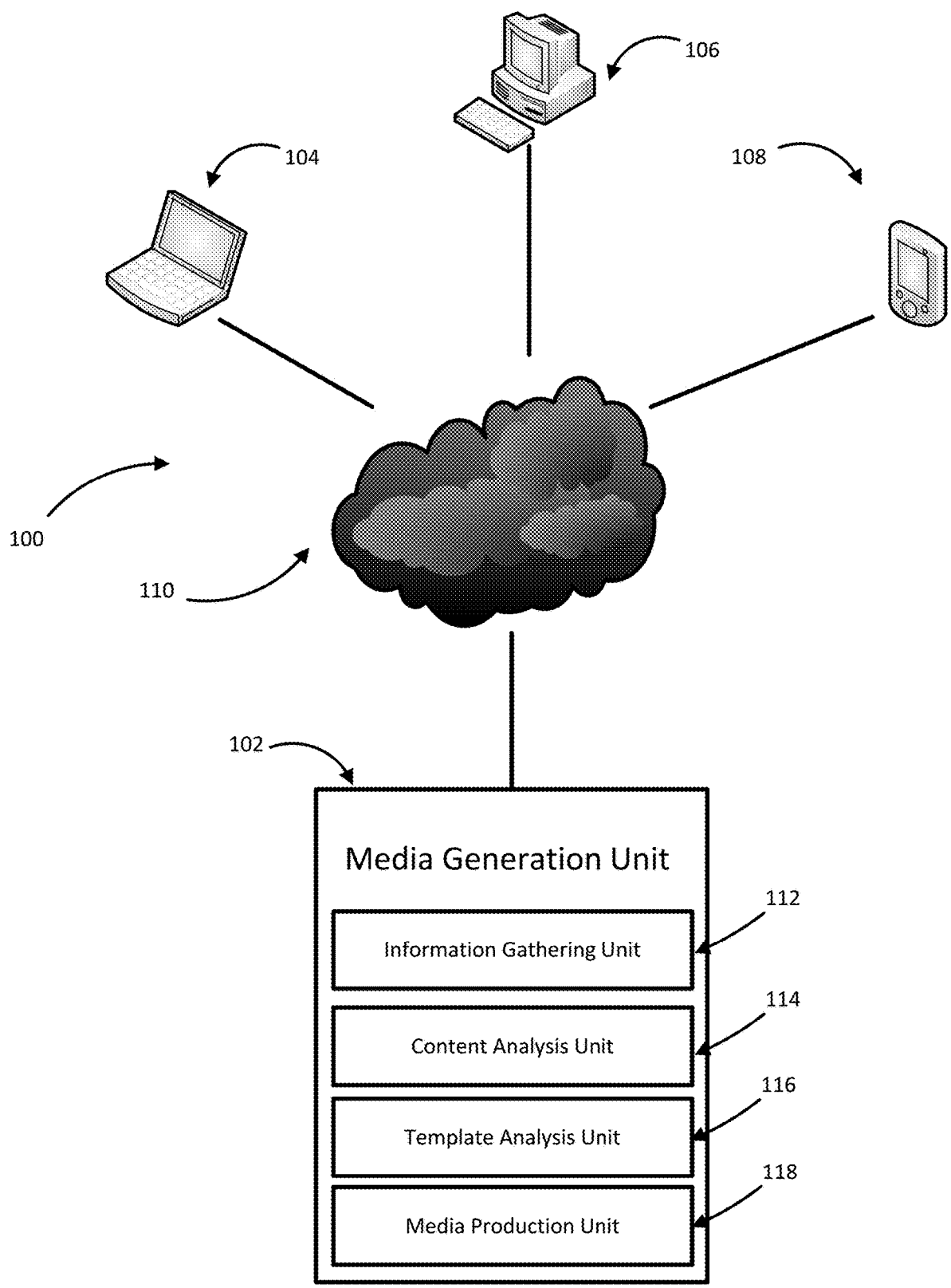
FIG. 1 depicts a block diagram of an Media Management System suitable for use with the methods and systems consistent with the present invention.

FIG. 1 depicts a block diagram of an Media Management System ("MMS") 100 suitable for use with the methods and systems consistent with the present invention. The MMS 100 comprises a plurality of computers 102, 104, 106 and 108 connected via a network 110. The network 110 is of a type that is suitable for connecting the computers for communication, such as a circuit-switched network or a packet switched network. Also, the network 110 may include a number of different networks, such as a local area network, a wide area network such as the Internet, telephone networks including telephone networks with dedicated communication links, connection-less network, and wireless networks. In the illustrative example shown in FIG. 1, the network 110 is the Internet. Each of the computers 102, 104, 106 and 108 shown in FIG. 1 is connected to the network 110 via a suitable communication link, such as a dedicated communication line or a wireless communication link.

In an illustrative example, computer 102 serves as an Media Generation Unit ("MGU") that includes an information gathering unit 112, a content analysis unit 114, a template analysis unit 116 and a media production unit 118. The number of computers and the network configuration shown in FIG. 1 are merely an illustrative example. One having skill in the art will appreciate that the MMS 100 may include a different number of computers and networks. For example, computer 102 may include the information gathering unit 112 and template analysis unit 116 and the content analysis unit 114 and the media production unit 118 may reside on a different computer.

Figure 2:
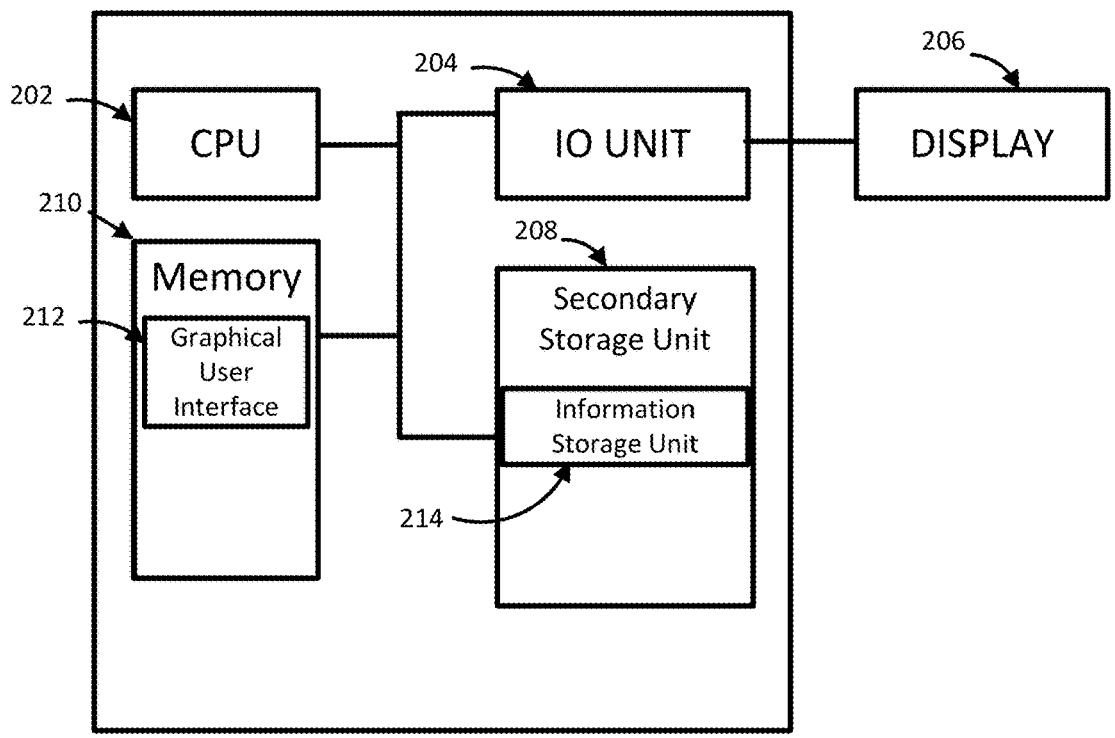
FIG. 2 shows a more detailed depiction of a computer of FIG. 1.

FIG. 2 shows a more detailed depiction of the computer 102. The computer 102 comprises a central processing unit (CPU) 202, an input output (IO) unit 204, a display device 206 communicatively coupled to the IO Unit 204, a secondary storage device 208, and a memory 210. The computer 202 may further comprise standard input devices such as a keyboard, a mouse, a digitizer, or a speech processing means (each not illustrated).

The computer 102's memory 210 includes a Graphical User Interface ("GUI") 212 that is used to gather information from a user via the display device 206 and I/O unit 204 as described herein. The GUI 212 includes any user interface capable of being displayed on a display device 206 including, but not limited to, a web page, a display panel in an executable program, or any other interface capable of being displayed on a computer screen. The GUI 212 may also be stored in the secondary storage unit 208. In one embodiment consistent with the present invention, the GUI 212 is displayed using commercially available hypertext markup language ("HTML") viewing software such as, but not limited to, Microsoft Internet Explorer, Google Chrome or any other commercially available HTML viewing software. The secondary storage unit 208 may include an information storage unit 214. The information storage unit may be a rational database such as, but not including Microsoft's SQL, Oracle or any other database.

Figure 3:
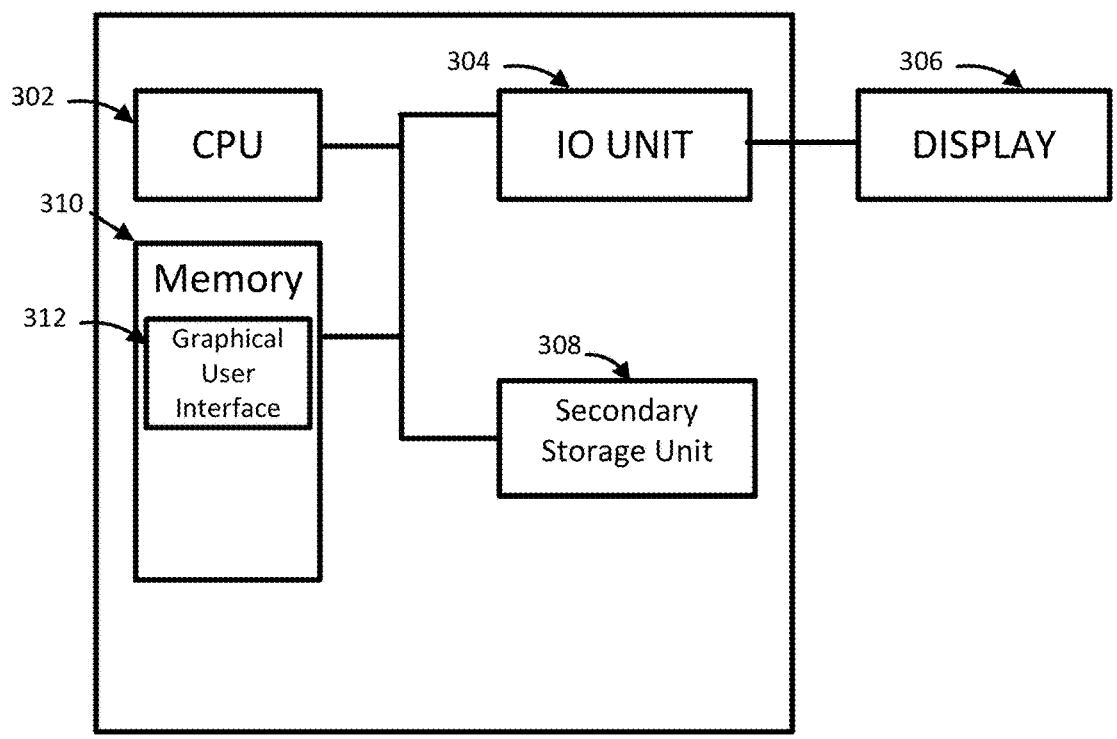
FIG. 3 shows a more detailed depiction of additional computers of FIG. 1.

FIG. 3 shows a more detailed depiction of the computers 104, 106 and 108. Each computer 104, 106 and 108 comprises a central processing unit (CPU) 302, an input output (IO) unit 304, a display device 306 communicatively coupled to the IO Unit 304, a secondary storage device 308, and a memory 310. Each computer 104, 106 and 108 may further comprise standard input devices such as a keyboard, a mouse, a digitizer, or a speech processing means (each not illustrated).

Each computer 104, 106 and 108's memory 310 includes a GUI 312 which is used to gather information from a user via the display device 306 and IO unit 304 as described herein. The GUI 312 includes any user interface capable of being displayed on a display device 306 including, but not limited to, a web page, a display panel in an executable program, or any other interface capable of being displayed on a computer screen. The GUI 312 may also be stored in the secondary storage unit 208. In one embodiment consistent with the present invention, the GUI 312 is displayed using commercially available HTML viewing software such as, but not limited to, Microsoft Internet Explorer, Google Chrome or any other commercially available HTML viewing software.

Figure 4:
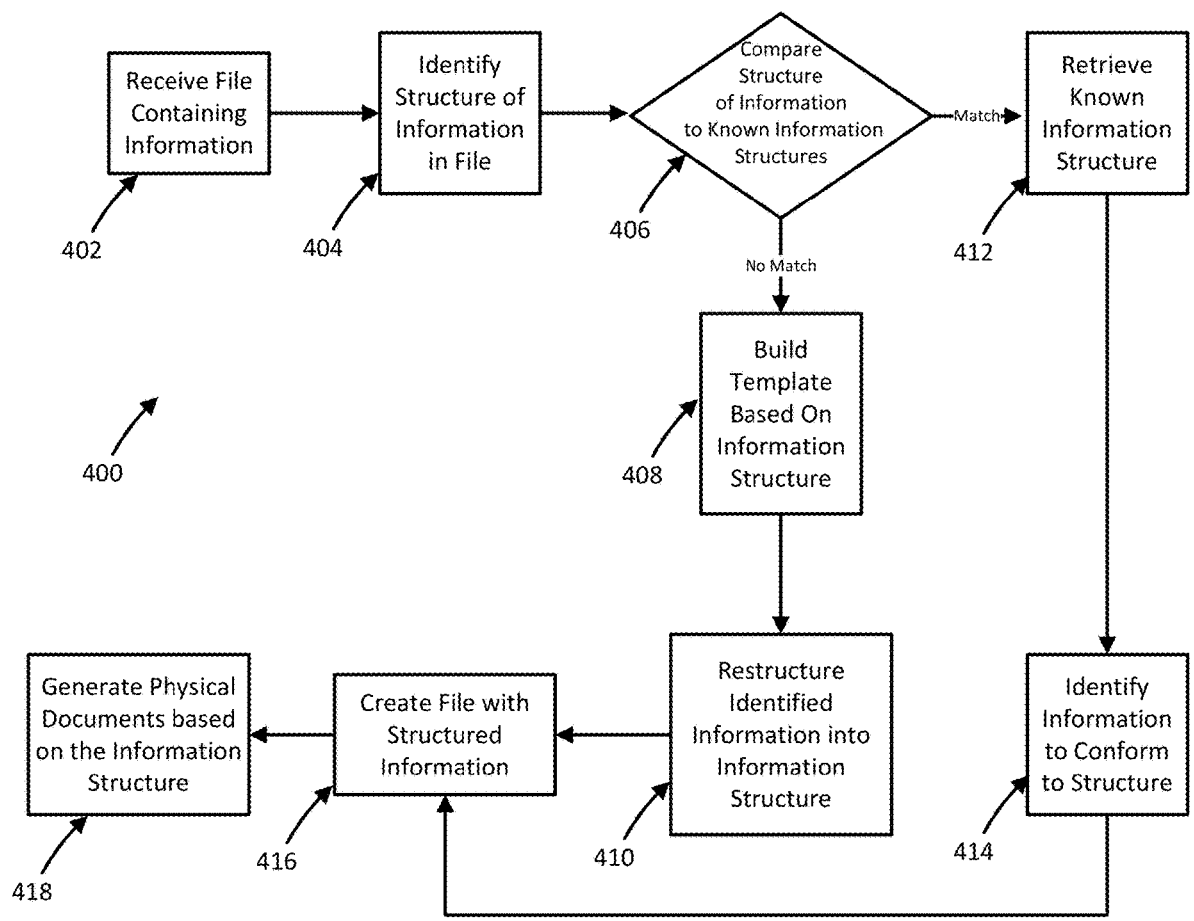
FIG. 4 depicts an illustrative example of the operation of the MMS of FIG. 1.

FIG. 4 depicts an illustrative example of the operation of the MMS 100. In step 402, a file containing information on media to be generated is received in the information gathering unit 112. In step 404, the content analysis unit 116 determines the format of the information in the file. The format may be a structured or unstructured file format including, but not limited to, a pdf file, a XML file, a XLS file or any other structured or unstructured file format. In step 406, the content analysis unit 114 opens the file and compares the structure of the information in the file with known information structures. In comparing the structure of the file, the content analysis unit 114 identifies known indicators in a file, such as header information, tag information, word or character arrangement or any other indicator and compares the indicator to indicators in known data structures. As an illustrative example, the content analysis unit 114 may identify the header portion of an XML file and compare the header portion to known header portions that are stored in the information storage unit 214.

In step 408, if the identified data structure matches a known data structure, information on the known data structure is retrieved from the information storage unit 214. In step 410, the template analysis unit 116 revises the information in the file to confirm to the known data structure. As an illustrative example, if the file is identified as an XML file, the structure of the file, including tags and headers is revised such that it complies with the tags and headers of the known data structure. In step 412, if there is no match for the identified data structure, the template analysis unit 116 generates a template based on the structure of the structure of the information in the file. In generating the template, the template analysis unit 114 may identify separation indicators of different words and phrases using conventional OCR and object recognition algorithms. The template analysis unit 114 may gather external information, such as gathering user input, to determine a category for different keywords or elements in the file. After all keywords and elements are recognized, the new file structure is saved in the information storage unit 214 as a known file structure.

In step 414, the template analysis unit 116 restructures the information in the file to conform to the new file structure in the newly generated template. In step 416, the template analysis unit 116 creates a new file using the information in the file and the identified file structure. In step 418, the media production unit 118 generates media based on the information in the file and the file structure. As an illustrative example, the information in the file may be information on the location, arrangement and color to be printed on a label. The file information may be arranged in an XML format using unknown tags and subtags. The content analysis unit 114 may determine if the tags and subtags are the same or similar to another logo layout. If the tags and subtags are the same or similar to known tags and subtags stored in the information storage unit 214, the file is reformatted using the known tags and subtags. If the tags are not the same or similar to the known tags, a new XML format may be created based on the tags and sub tags in the file. Once the file structure is determined, the media is generated based on the information in file. By comparing the information in the file to known data structures, all media can be configured to a standard format for faster and more accurate processing.

Figure 5:
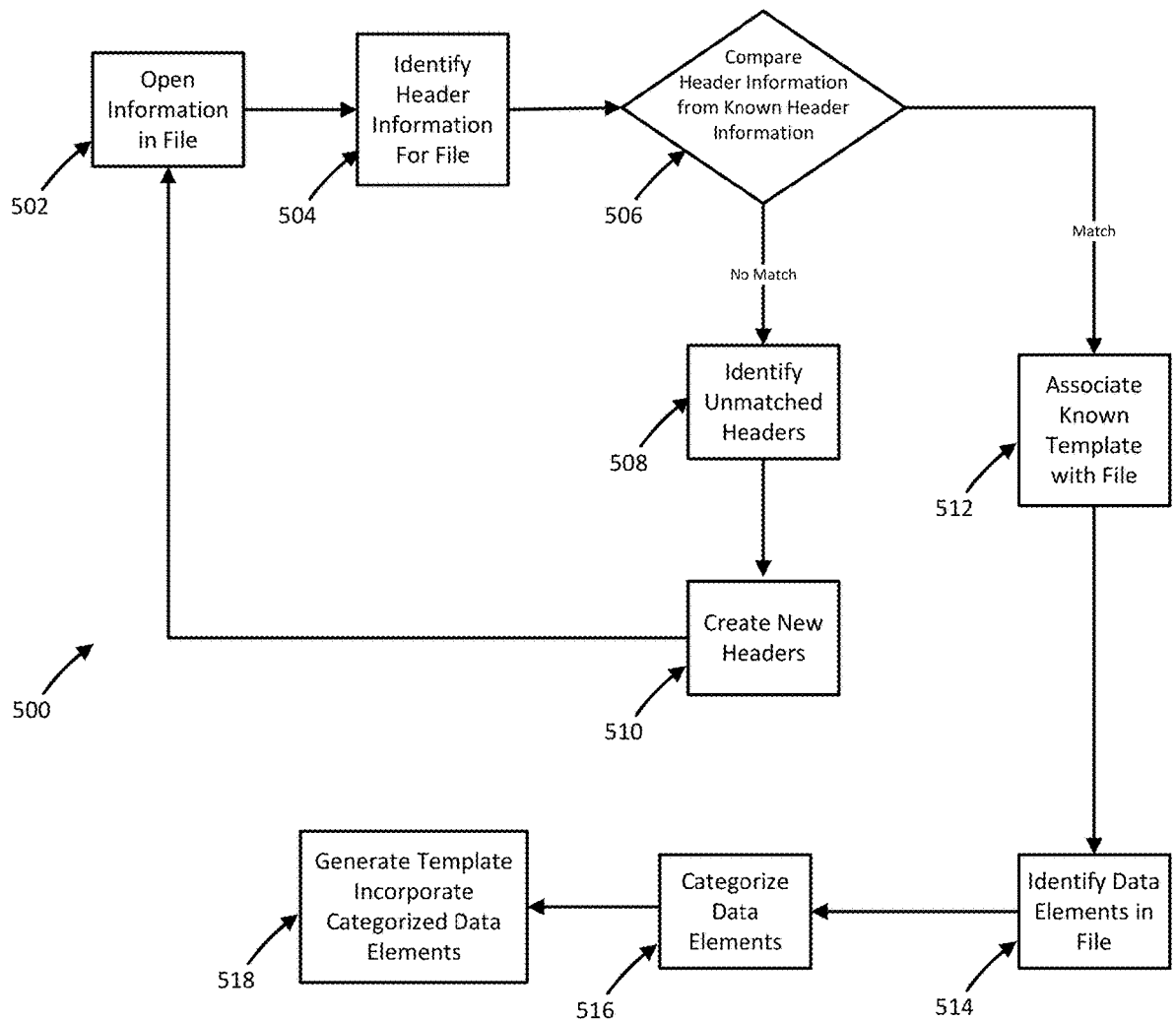
FIG. 5 depicts a schematic representation of a method of identifying the file structure of a file.

FIG. 5 depicts a schematic representation of a method of identifying the file structure of a file. In step 502, the information gathering unit 112 opens a file containing information on media. In step 504, the content analysis unit 114 identifies the header information in the file. In step 506, the content analysis unit 114 compares the identified header information in the file with header information from known file structures. In step 508, if the identified header information does not match known header information, the content analysis unit 114 identifies the unmatched header information. In step 510, the content analysis unit 114 creates a new template incorporating the new headers information. In step, 512, if the header information matches known header information, the content analysis unit 114 associates each header in the file with the known header information. In step 514, the content analysis unit 114 identifies data elements in the file. Data elements may include information marked in an XML file with tags or sub tags or information separated by a indicator such as a comma. In step 516, the content analysis unit 116 categorizes the data elements based on the header information, information associated with the data element or the data element itself. In step 518, the template analysis unit 118 generates a new template incorporating the categorized elements.

Figure 6:
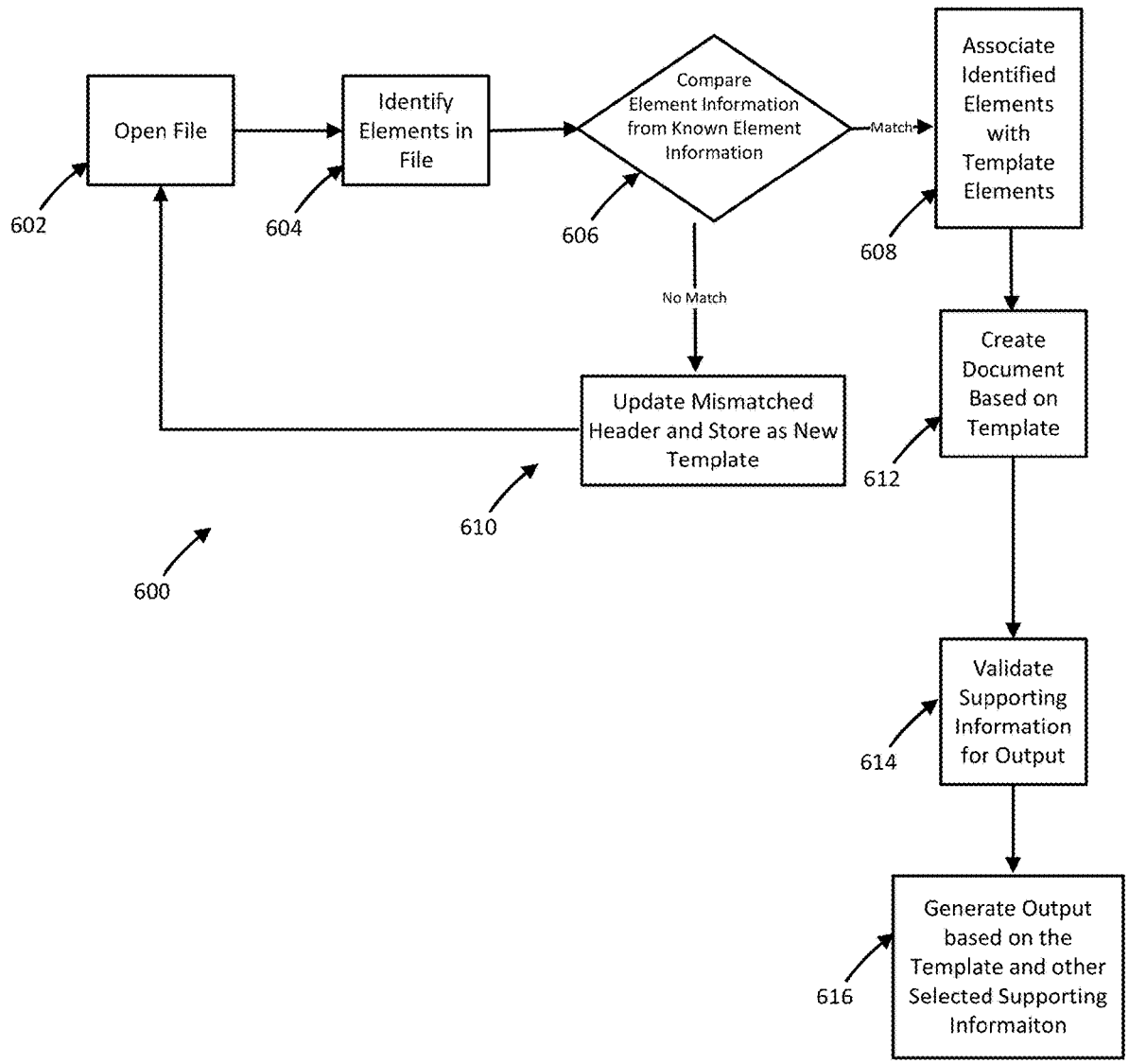
FIG. 6 depicts a schematic representation of a method of identifying elements within the file structure of a file.

FIG. 6 depicts a schematic representation of a method of identifying elements within the file structure of a file. In step 602, the information gathering unit 112 opens a file. In step 604, the content analysis unit 114 identifies data elements in the file. Data elements may include information marked in an XML file with tags or sub tags or information separated by a indicator such as a comma. In step 606, the content analysis unit 112 compares the identified elements with known element types. In step 608, if the identified element is the same or similar to a known element type from a file template, the template analysis unit 116 create a document using the template incorporating the known element type. In step 612, the template analysis unit 116 validates the information in the newly created file based on rules associated with the template in the information storage unit 214. The rules may include information on the arrangement, color, wording or any other aspect of the media that is outputted. In step 614, the media production unit 118 generates the media based on the new file. In step 610, if the identified elements are not matched with known elements, a new template is generated incorporating the new elements.

In the present disclosure, the words "a" or "an" are to be taken to include both the singular and the plural. Conversely, any reference to plural items shall, where appropriate, include the singular.

It should be understood that various changes and modifications to the presently preferred embodiments disclosed herein will be apparent to those skilled in the art. Such changes and modifications can be made without departing from the spirit and scope of the present disclosure and without diminishing its intended advantages. It is therefore intended that such changes and modifications be covered by the appended claims.

The invention claimed is:

1. A media management system comprising:
one or more processing devices; and
one or more non-transitory, processor-readable storage media in communication with the one or more processing devices, wherein the one or more non-transitory, processor-readable storage media contain one or more programming instructions that, when executed, cause the one or more processing devices to:
analyze, using a first processor, a media output to determine if the media output has a format that is structured or unstructured, wherein the media output defines properties of a printed physical media product,
analyze information on the media output to identify known indicators of the information,
compare the known indicators of the information to a known information template corresponding to a physical label characteristic, wherein the known information template is one of a plurality of templates stored in a database,
determine whether each of the known indicators substantially matches tagging in the known information template,
responsive to a determination that each of the known indicators substantially matches the tagging in the known information template, reformat the information to a similar file structure to form a structured information, and
responsive to a determination that each of the known indicators do not substantially match the tagging in the known information template, create a new information template based on a data structure of the information, identify separation indicators of words and phrase in the new information template using at least one of optical character recognition and object recognition algorithms, and conform the information to the new information template to create a structured information, wherein the new information template is distinct from any template in the database; and
generate, using a second processor, the printed physical media product based on the structured information, wherein the physical media product corresponds to the physical label characteristic.

2. The media management system of claim 1, wherein the information on a media output, responsive to a determination the media output is structured, comprises header information in a file.

3. The media management system of claim 1, wherein the one or more programming instructions that, when executed, further cause the one or more processing devices to, responsive to a determination the media output is structured, identify at least one data element in the media output.

4. The media management system of claim 3, wherein the one or more programming instructions, when executed, further cause the one or more processing devices to compare the at least one identified data element to at least one known data element.

5. The media management system of claim 4, wherein the one or more programming instructions, when executed, further cause the one or more processing devices to identify an information template based on the comparison of the at least one identified data element with the at least one known data element.

6. The media management system of claim 5, wherein the one or more programming instructions, when executed, further cause the one or more processing devices to identify at least one rule associated with the information template.

7. The media management system of claim 6, wherein the one or more programming instructions, when executed, further cause the one or more processing devices to apply the at least one rule to the media output.

8. The media management system of claim 1, wherein the data structure of the media output is an extensible markup language (XML) structure.

9. The media management system of claim 1, wherein the data structure of the media output is a comma separated variable (CSV) structure.

10. A method of structuring media, the method comprising:
gathering information on a media output, wherein the media output defines properties of a printed physical media product;
analyzing, using a first processor, the media output to identify if the media output has a format that is structured or unstructured;
analyzing the information on the media output to identify known indicators of the information;
comparing the known indicators to a known information template and corresponding to physical label characteristics, wherein the known information template is one of a plurality of templates stored in a database;
determining whether each of the known indicators substantially matches tagging in the known information template;
reformatting the information to a similar file structure responsive to a determination that each of the known indicators substantially matches the tagging in the known information template to form a structured information;
creating a new information template based on the known indicators of the information responsive to a determination that each of the known indicators do not substantially match the tagging in the known information template, wherein the new information template is distinct from any template in the database;
identifying separation indicators of words and phrase in the new information template using at least one of optical character recognition and object recognition algorithms;
conforming the information to the new information template to create a structured information; and
generating, using a second processor, the printed physical media product based on the structured information, wherein the physical media product corresponds to the physical label characteristic.

11. The method of claim 10, wherein analyzing the information on the media output includes analyzing header information in a file.

12. The method of claim 10, wherein analyzing the information on the media output includes identifying at least one data element in the media output.

13. The method of claim 12, further comprising comparing the at least one identified data element to at least one known data element.

14. The method of claim 13, further comprising identifying an information template based on the comparison of the identified data elements with the known data elements.

15. The method of claim 14, further comprising identifying at least one rule associated with the information template.

16. The method of claim 15, wherein generating a physical media product includes applying the at least one rule associated with the template to the structured information.

17. The method of claim 10, wherein the data structure of the media output is an extensible markup language (XML) structure.

18. The method of claim 10, wherein the data structure of the media output is a comma separated variable (CSV) structure.

* * * * *